Oct. 2, 1923.

L. P. HALLADAY

BUMPER

Filed Dec. 1, 1922

1,469,592

Witness
Edward F. Wray.

Inventor.
Lewis P. Halladay.
by Parker & Carter
Attorneys

Patented Oct. 2, 1923.

1,469,592

UNITED STATES PATENT OFFICE.

LEWIS P. HALLADAY, OF DECATUR, ILLINOIS.

BUMPER.

Application filed December 1, 1922. Serial No. 604,170.

*To all whom it may concern:*

Be it known that I, LEWIS P. HALLADAY, a citizen of the United States, residing at Decatur, in the county of Macon and State of Illinois, have invented a certain new and useful Improvement in Bumpers, of which the following is a specification.

This invention relates to improvements in automobile bumper bars of the type wherein the bumper is vertically widened throughout at least a portion of its length, and wherein a vertically extended impact surface is provided. One object of the invention is to provide a bumper of this type which has a large measure of strength from front to rear so that in the case of impact with an obstacle, it will not readily give way or be broken or bent. Other objects will appear from time to time throughout the specification and claims.

My invention is illustrated more or less diagrammatically in the accompanying drawing, wherein.

Like parts are designated by like characters throughout.

Figure 1:
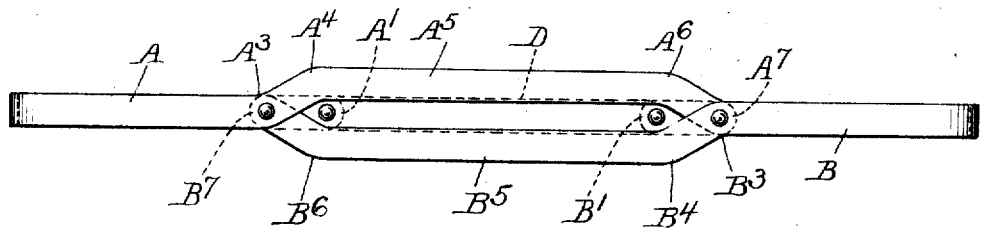
Figure 1 is a front elevation of the device.
Figure 2:
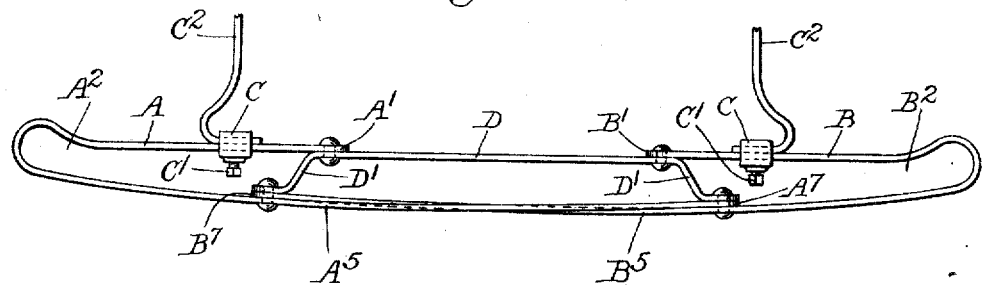
Figure 2 is a plan view of the device shown in Figure 1.

The bumper proper is formed of two members, the member A commencing at the point $A^1$, bent to form the loop $A^2$, upwardly bent at $A^3$, laterally bent at $A^4$, extending laterally at $A^5$, downwardly bent at $A^6$ and terminating at $A^7$ at which point it is riveted or otherwise securely fastened to the member B. This member is correspondingly shaped, commencing at $B^1$, bent to form the loop $B^2$, downwardly bent at $B^3$, laterally bent at $B^4$, laterally exended to form the member $B^5$, upwardly bent at $B^6$ and terminating at $B^7$ where it is riveted or otherwise firmly secured to the member A.

To the rear of each of the loops $A^2$, $B^2$, is attached an engaging member C, C which is adjustably held in position by means of the set screws $C^1$, $C^1$. The members C are provided to engage the bumper supporting bars $C^2$, $C^2$, which extend rearwardly and are attached to any suitable bracket or fitting on the automobile frame, whereby the bumper is supported from the frame.

D is a reinforcing member extending laterally and lying in rear of the vertically widened portion of the bumper, and lying in the same horizontal plane as the narrowed portions of the bumper. It is riveted or otherwise rigidly secured to the members A, and B at their ends $A^1$, $B^1$ respectively. It is provided with forwardly bent portions $D^1$, $D^1$ and is secured at the ends of these portions to the members A and B at the points $A^7$ and $B^7$ respectively.

By means of the reinforcing member D, I have produced a bumper which is double throughout its length. The greatest measure of protection given by bumpers is not in withstanding small bumps but is in withstanding shocks of great violence, shocks sufficient to distort the bumper and to bend it beyond its elastic limit and thereby to cause the parts to take a permanent set. If a bumper under such extreme shocks does not break but merely bends, it renders its greatest measure of protection. Thus in the bumper shown, should a violent blow be delivered upon the bumper anywhere along its vertically widened portion, the bumper will bend inward and at first the greatest strain will come upon the reinforcing member which tends to resist separation of the ends of the bumper, and also tends to resist the crushing of the bumper which would spring its front and rear together. If the blow continues, the rear reinforcing member D will ultimately fail and then at the time when the greatest necessity arises, the front double portion of the bumper, which is finally its strongest portion, remains and can continue the work of shielding the car from the blow. Thus by the construction shown the bumper is strengthened for all ordinary light blows, and for violent and extremely heavy blows which might destroy it, it is provided with a two part main resisting frame which greatly strengthens its resistance to such crushing blows.

Although I have shown an operative invention, still it will be obvious that many changes in size, shape, and arrangement of parts might be made without departing materially from the spirit of my invention, and I wish therefore that my showing be taken as in a sense diagrammatic.

I claim:

1. A bumper bar including two identically shaped members associated to form a pair of horizontally disposed spring loops joined by a single vertically disposed spring loop, said single loop being substantially in line with the forward faces of said loops, there being a rearward reinforcing member in the same horizontal plane as said loops and in line with their rear faces, said reinforcing member being joined at its ends to said vertically disposed loop and being joined intermediate its ends to the rear ends of said spring members.

2. A bumper bar including two identically shaped members associated to form a pair of horizontally disposed spring loops joined by a single vertically disposed spring loop, said single loop being substantially in line with the forward faces of said loops, there being a rearward reinforcing member in the same horizontal plane as said loops and in line with their rear faces, and in rear of the center of said vertically disposed loop, said reinforcing member being joined at its ends to said vertically disposed loop and being joined intermediate its ends to the rear ends of said spring members.

3. A bumper bar including two identically shaped members associated to form a pair of horizontally disposed loops joined by a single vertically disposed loop, said horizontally disposed loops being laterally spaced away from each other, and bumper supporting brackets removably attached to each of said loops in its rear, said loops being joined in line with their rear sides by a laterally extending reinforcing member, said member provided with forwardly extending ends joined to the front of the bumper adjacent the ends of the vertically disposed loop.

4. A bumper bar including two identically shaped spring members associated to form a pair of horizontally disposed loops joined by a single vertically disposed loop, there being a rearward reinforcing member in line with the rear faces of said horizontally disposed loops and being joined at its ends to the vertically disposed loop and joined intermediate its ends to the rear of the spring members.

5. A bumper bar including two identically shaped spring members associated to form a pair of horizontally disposed spring loops joined by a single vertically disposed spring loop, there being a rearward reinforcing member in line throughout the major portion of its length with the rear faces of said horizontally disposed loops, said reinforcing member being joined at its ends to said vertically disposed loop and being joined intermediate its ends to the rear ends of said spring members.

Signed at Chicago, county of Cook and State of Illinois, this 24th day of November, 1922.

LEWIS P. HALLADAY.